US009835217B2

(12) United States Patent
Nakamura et al.

(10) Patent No.: US 9,835,217 B2
(45) Date of Patent: Dec. 5, 2017

(54) COIL SPRING MODELING APPARATUS AND METHOD UTILIZING A TORSION DETECTION TO CONTROL AN ACTUATOR UNIT

(71) Applicants: NHK SPRING CO., LTD., Yokohama-shi, Kanagawa (JP); NHK INTERNATIONAL CORPORATION, Wixom, MI (US)

(72) Inventors: Takahiro Nakamura, Yokohama (JP); Kazuo Furukawa, Machida (JP); Senri Moriyama, Yokohama (JP); Ryuichi Sato, Yokohama (JP); Shinichi Nishizawa, Walled Lake, MI (US)

(73) Assignees: NHK SPRING CO., LTD., Yokohama-Shi (JP); NHK INTERNATIONAL CORPORATION, Wixom, MI (US)

( * ) Notice: Subject to any disclaimer, the term of this patent is extended or adjusted under 35 U.S.C. 154(b) by 325 days.

(21) Appl. No.: 14/620,916

(22) Filed: Feb. 12, 2015

(65) Prior Publication Data
US 2016/0238098 A1    Aug. 18, 2016

(51) Int. Cl.
*G05B 13/00* (2006.01)
*G01N 3/26* (2006.01)
(Continued)

(52) U.S. Cl.
CPC ........ *F16F 1/04* (2013.01); *F16F 2230/0017* (2013.01)

(58) Field of Classification Search
CPC ...................................................... G05B 15/02
(Continued)

(56) References Cited

U.S. PATENT DOCUMENTS 4,718,514 A * 1/1988 Hirakushi ................ B62D 6/02
                                                      180/422
5,322,319 A   6/1994 Tanaka et al.
(Continued)

FOREIGN PATENT DOCUMENTS

JP          0521096 A      10/1993
JP       2007256019 A      10/2007

OTHER PUBLICATIONS

International Search Report (ISR) dated Apr. 19, 2016, issued in counterpart International Application No. PCT/JP2016/054014.
(Continued)

*Primary Examiner* — Suresh Suryawanshi
(74) *Attorney, Agent, or Firm* — Holtz, Holtz & Volek PC

(57) ABSTRACT

A coil spring modeling apparatus includes a first attachment member disposed on a lower spring seat, a second attachment member disposed on an upper spring seat, an actuator unit formed of a Stewart-platform-type parallel mechanism, a hydraulic pressure supply device, a torsion detection mechanism, and a controller. The torsion detection mechanism is constituted of displacement gauges such as a linear variable differential transformer. The displacement gauges are provided on hydraulic cylinders, and detect amounts of displacement relative to the reference lengths of the hydraulic cylinders, respectively. The controller calculates a relative torsional angle between the first attachment member and the second attachment member based on the detected displacement.

8 Claims, 9 Drawing Sheets

(51) Int. Cl.
*G01H 1/10* (2006.01)
*F16F 1/04* (2006.01)

(58) Field of Classification Search
USPC .......................................................... 700/275
See application file for complete search history.

(56) References Cited

U.S. PATENT DOCUMENTS

| | | | |
|---|---|---|---|
| 5,390,948 | A | 2/1995 | Kuriki et al. |
| 5,489,115 | A | 2/1996 | Osaki et al. |
| 6,253,620 | B1 * | 7/2001 | Yamashita ............ G01P 15/165 |
| | | | 73/650 |
| 7,110,926 | B2 | 9/2006 | Nishizawa et al. |
| 7,434,458 | B2 | 10/2008 | Nishizawa et al. |
| 7,606,690 | B2 | 10/2009 | Nishizawa et al. |
| 8,214,184 | B2 | 7/2012 | Nishizawa et al. |
| 8,215,188 | B2 * | 7/2012 | Klimenko ................ B62D 6/10 |
| | | | 73/862.31 |
| 9,406,411 | B2 | 8/2016 | Sayeh et al. |
| 9,506,225 | B2 | 11/2016 | Kim |
| 9,533,541 | B2 | 1/2017 | Kim |
| 2003/0111309 | A1 | 6/2003 | Nishizawa et al. |

OTHER PUBLICATIONS

Nishizawa, et al., "Development of Programmable Force Line Generator for Coil Springs", (2005), No. 50, pp. 39-46.
International Search Report (ISR) dated Aug. 18, 2016, issued in counterpart International Application No. PCT/JP2016/054014.
Related U.S. Appl. No. 14/620,795, filed Feb. 12, 2015, First Named Inventor: Takahiro Nakamura, Title: "Coil Spring Modeling Apparatus".
Related U.S. Appl. No. 14/620,855, filed Feb. 12, 2015, First Named Inventor: Takahiro Nakamura, Title: "Coil Spring Modeling Apparatus and Method of the Same".
Nishizawa, et al., "Experimental Study on the Effect of Coil Spring Reaction Force Vector on McPherson Strut Suspension Characteristics", SAE 2014 World Congress & Exhibition, published Apr. 1, 2014, pp. 1-6.
Nishizawa, et al., "Experiments on Influence of Coil Spring Reaction Force Axis on Vehicle Characteristics, using 'Universal Springs'", Japan Society of Spring Engineers (JSSE) 2013 Autumn Lecture Meeting, published Nov. 1, 2013, pp. 21-24.

* cited by examiner

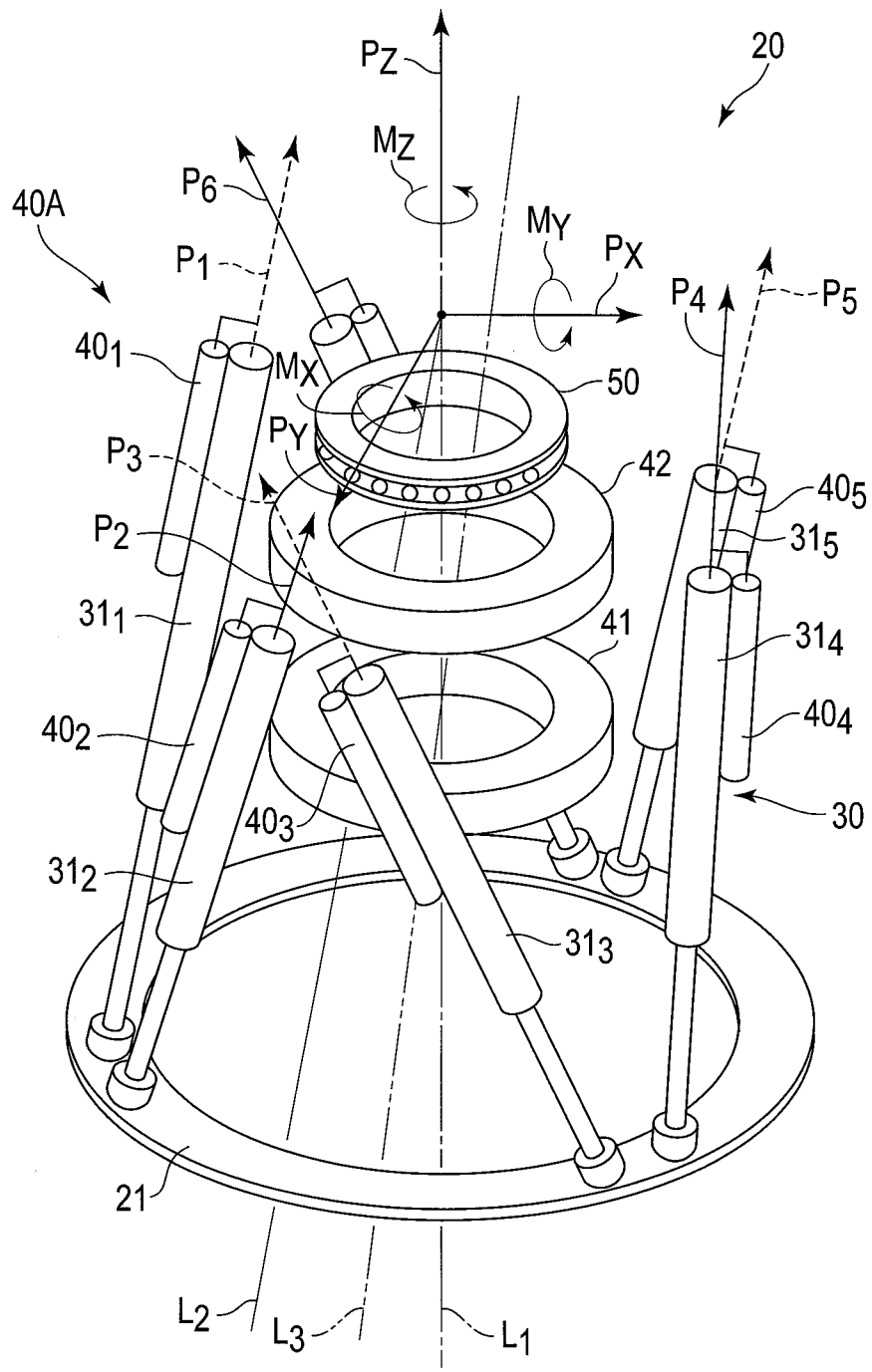
F I G. 7

COIL SPRING MODELING APPARATUS AND METHOD UTILIZING A TORSION DETECTION TO CONTROL AN ACTUATOR UNIT

BACKGROUND OF THE INVENTION

1. Field of the Invention

The present invention relates to a coil spring modeling apparatus capable of producing a reactive force (repulsive force) corresponding to compression of a helical spring such as a suspension coil spring, and a method of controlling the same.

2. Description of the Related Art

As an example of a vehicle suspension system, a McPherson-strut-type suspension is known. The McPherson-strut-type suspension comprises a coil spring, and a strut (a shock absorber) provided inside of the coil spring. The coil spring is compressed by a load applied from above the coil spring, and is extended and retracted in accordance with the load. The strut is also extended and retracted.

In the McPherson-strut-type suspension, in order to reduce the sliding resistance of a strut, offsetting a force line position (FLP) of a coil spring from the center line of the coil spring is known. For example, the force line position (FLP) of a coil spring is set at a position where the friction of the strut is minimal. For this reason, the relationship between a force line position (FLP) of a coil spring and the sliding resistance of a strut must be specified. However, producing a variety of coil springs whose force line positions are different by way of trial is time consuming and costly. Thus, instead of using the coil spring, using a coil spring modeling apparatus has been proposed.

For example, a coil spring modeling apparatus disclosed in, U.S. Pat. No. 7,606,690 (Document 1) is known. Also, an improved coil spring modeling apparatus is disclosed in "Research of Effect of Coil Spring Reaction Force Line on Vehicle Characteristics by Universal Spring" (Document 2), on pages 21 to 24 of the proceedings, presentation of which was made in the conference held by the Japan Society of Spring Engineers (in Nagoya) on Nov. 1, 2013, and "Experimental Study on the Effect of Coil Spring Reaction Force Vector on Suspension Characteristics" of SAE 2014 (Document 3), presentation of which was made in the U.S. (Detroit) on Apr. 8, 2014. The coil spring modeling apparatus disclosed in the above documents has a Stewart-platform-type parallel mechanism comprising six hydraulic cylinders. By actuating each of the hydraulic cylinders by fluid pressure, a reactive force corresponding to compression of a coil spring can be produced.

In the McPherson-strut-type suspension, when a coil spring is compressed between the lower spring seat and the upper spring seat, it is known that torsion (a relative change of rotational position) is produced between the lower end turn portion and the upper end turn portion in accordance with the amount of compression. While an upper bearing is disposed between the upper spring seat and a mount portion on the side of a vehicle, the upper bearing has some degree of friction (rotational resistance). Therefore, if the coil spring is compressed, by the friction of the upper bearing, a moment in the rotational direction is produced between the lower end turn portion and the upper end turn portion. This moment produces a kingpin moment (KPM; a moment about a kingpin axis). The kingpin moment (KPM) becomes a factor which adversely affects the steering performance of a vehicle. The kingpin moment (KPM) changes in accordance with a geometric positional relationship between the kingpin axis and the strut axis. Also, the kingpin moment (KPM) may sometimes be affected by a force line position (FLP).

The coil spring modeling apparatus conceived by the inventors of the present invention includes an actuator unit (for example, a Stewart-platform-type parallel mechanism) which is actuated by fluid pressure. A strut set in the coil spring modeling apparatus includes a first strut element (for example, an outer tube) and a second strut element (for example, a rod). An upper end of the coil spring modeling apparatus is supported by a base member just like the actual mount portion of a vehicle. A bearing is disposed between the base member and the upper spring seat.

In measuring a kingpin moment (KPM), a torque about the kingpin axis is applied to the first strut element by, for example, a push-pull testing unit. The torque is conveyed to the upper spring seat via the actuator unit. Accordingly, if the friction of the bearing is zero, the upper spring seat rotates as much as the lower spring seat. However, in reality, since the bearing has friction, rotation of the upper spring seat meets resistance. Consequently, the actuator unit is twisted and the force line position (FLP) is also changed, which causes a problem that the kingpin moment (KPM) cannot be measured accurately.

BRIEF SUMMARY OF THE INVENTION

Accordingly, an object of the present invention is to provide a coil spring modeling apparatus which enables a kingpin moment (KPM) to be measured accurately, and a method of controlling the same.

An embodiment of the present invention relates to a coil spring modeling apparatus which is provided on a strut including a lower spring seat and an upper spring seat, and comprises a first attachment member disposed on the lower spring seat, a second attachment member disposed on the upper spring seat, an actuator unit which is arranged between the first attachment member and the second attachment member, and extends and retracts, a controller configured to control the actuator unit, and a torsion detection mechanism. The torsion detection mechanism detects a torsional angle formed between the first attachment member and the second attachment member.

According to the coil spring modeling apparatus of the present embodiment, a relative torsional angle formed by the lower spring seat and the upper spring seat is detected by the torsion detection mechanism. The torsional angle is affected by the friction of a rotation support mechanism which is arranged between a base member and the upper spring seat. The controller of the coil spring modeling apparatus according to one embodiment corrects, in a state where the torsional angle is detected by the torsion detection mechanism, a force line position (FLP) in accordance with the detected torsional angle. Alternatively, the actuator unit is controlled such that the torsional angle becomes zero. The coil spring modeling apparatus of the present embodiment enables a kingpin moment (KPM) to be accurately detected.

An example of the actuator unit comprises a Stewart-platform-type parallel mechanism including six hydraulic cylinders arranged with their inclinations changed alternately between the first attachment member and the second attachment member. An example of the torsion detection mechanism is constituted of displacement gauges which are provided on the hydraulic cylinders and detect amounts of displacement relative to reference lengths of the hydraulic cylinders, respectively.

Each of the displacement gauges is an LVDT comprising a plunger, and the coil spring modeling apparatus of the present embodiment may further comprise a guide rod which is arranged parallel to the plunger and guides a linear motion of the plunger. Also, the coil spring modeling apparatus of the present embodiment further comprises a first inner load cell configured to detect an axial force applied to the lower spring seat and a moment about the axis, and a second inner load cell configured to detect an axial force applied to the upper spring seat and a moment about the axis.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 7 is a perspective view schematically showing a part of the coil spring modeling apparatus shown in FIG. 2;

DETAILED DESCRIPTION OF THE INVENTION

Figure 1:
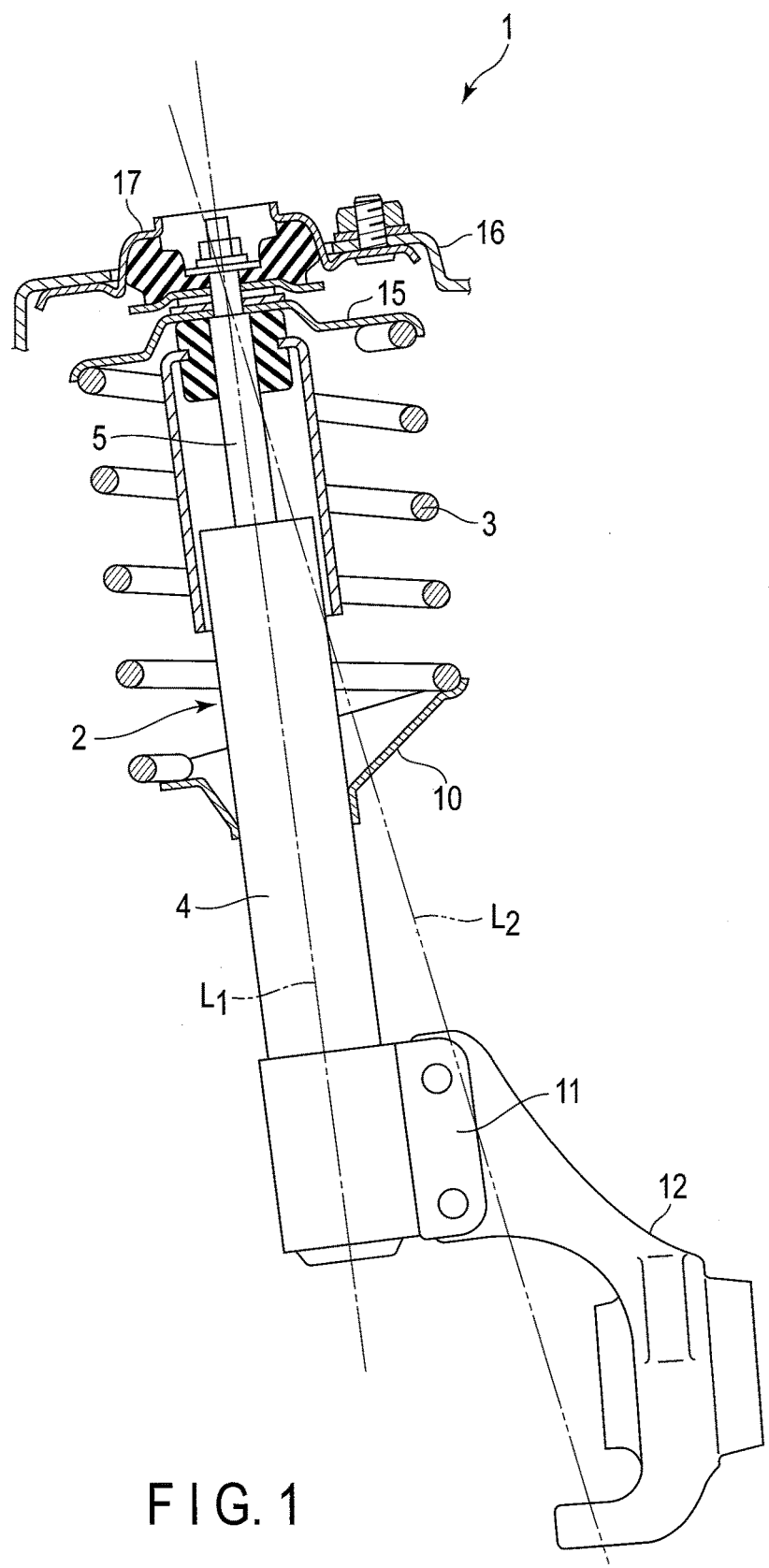
FIG. 1 is a cross-sectional view of a McPherson-strut-type suspension.

FIG. 1 shows a McPherson-strut-type suspension 1, which is an example of a suspension system used in vehicles. The suspension 1 comprises a shock absorber as a strut 2, and a suspension coil spring 3 (which is hereinafter simply referred to as a coil spring 3). The strut 2 comprises an outer tube 4 as a first strut element, and a rod 5 as a second strut element. The rod 5 is inserted into the outer tube 4. A damping force generation mechanism is provided at a distal end of the rod 5 inserted into the outer tube 4. The outer tube 4 and the rod 5 can be moved relatively along axis $L_1$ (strut axis).

The outer tube 4 is provided with a lower spring seat 10. At the lower end of the outer tube 4, a bracket 11 is provided. A knuckle member 12 is mounted on the bracket 11. A wheel axis is supported by the knuckle member 12. An upper spring seat 15 is provided near the upper end of the rod 5.

A mount insulator 17 is provided between the upper spring seat 15 and a body member 16. When a steering operation is performed, the strut 2 is pivoted about kingpin axis $L_2$ by the steering control force input to the knuckle member 12. The coil spring 3 is provided in a state in which the coil spring 3 is compressed between the lower spring seat 10 and the upper spring seat 15.

Figure 2:
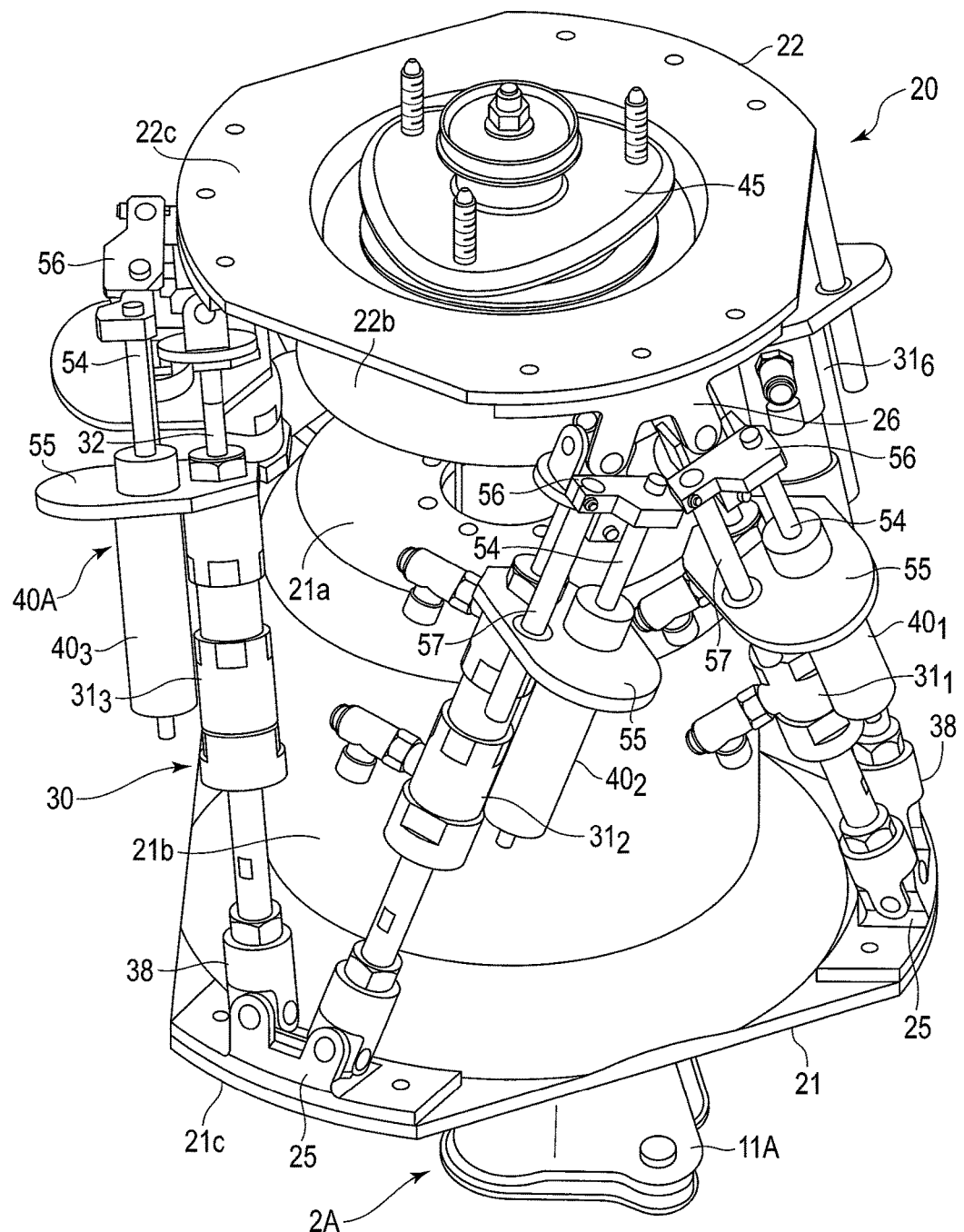
FIG. 2 is a perspective view of a coil spring modeling apparatus according to an embodiment.
Figure 3:
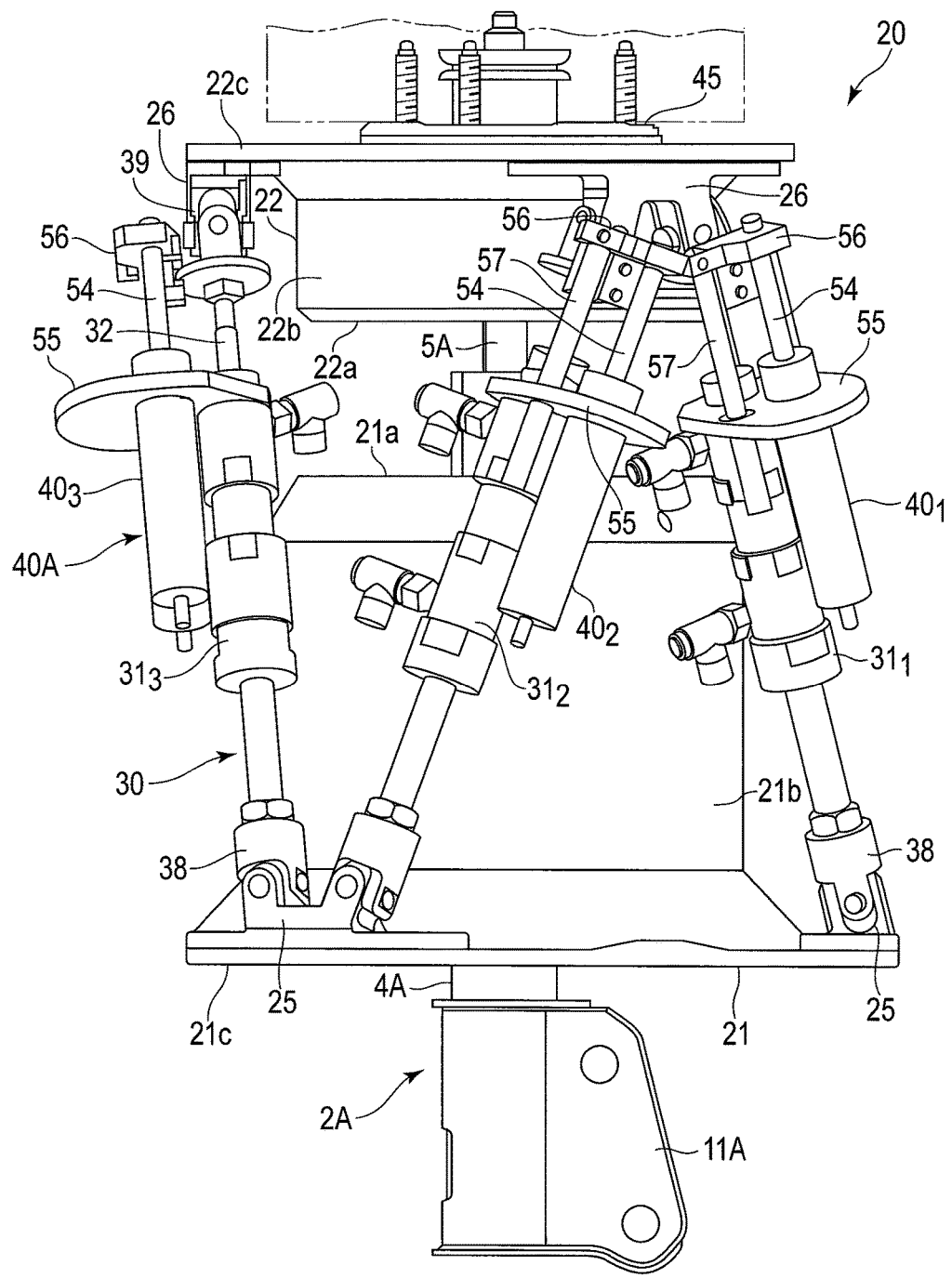
FIG. 3 is a side view of the coil spring modeling apparatus shown in FIG. 2.
Figure 4:
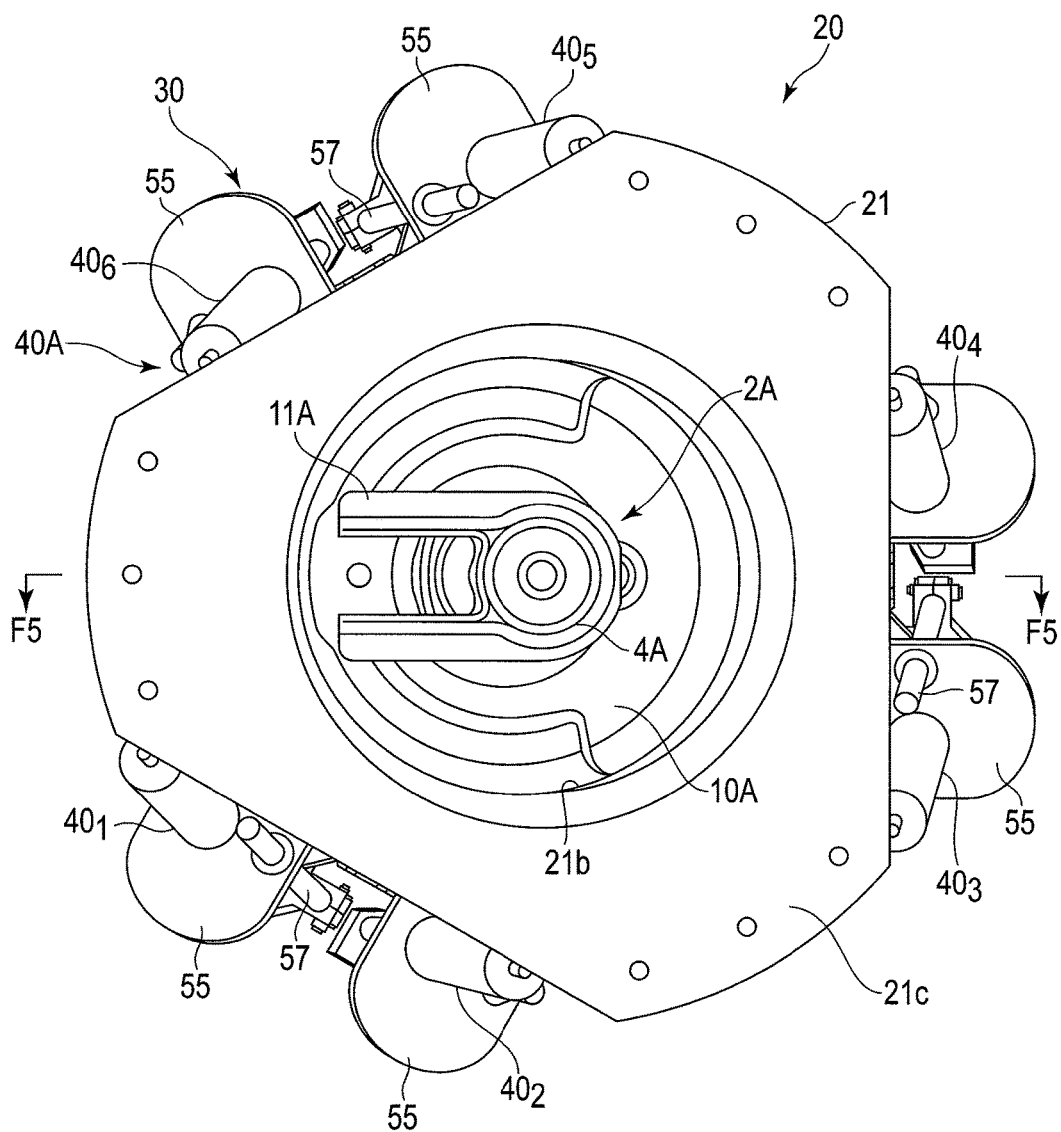
FIG. 4 is a bottom view of the coil spring modeling apparatus shown in FIG. 2.
Figure 5:
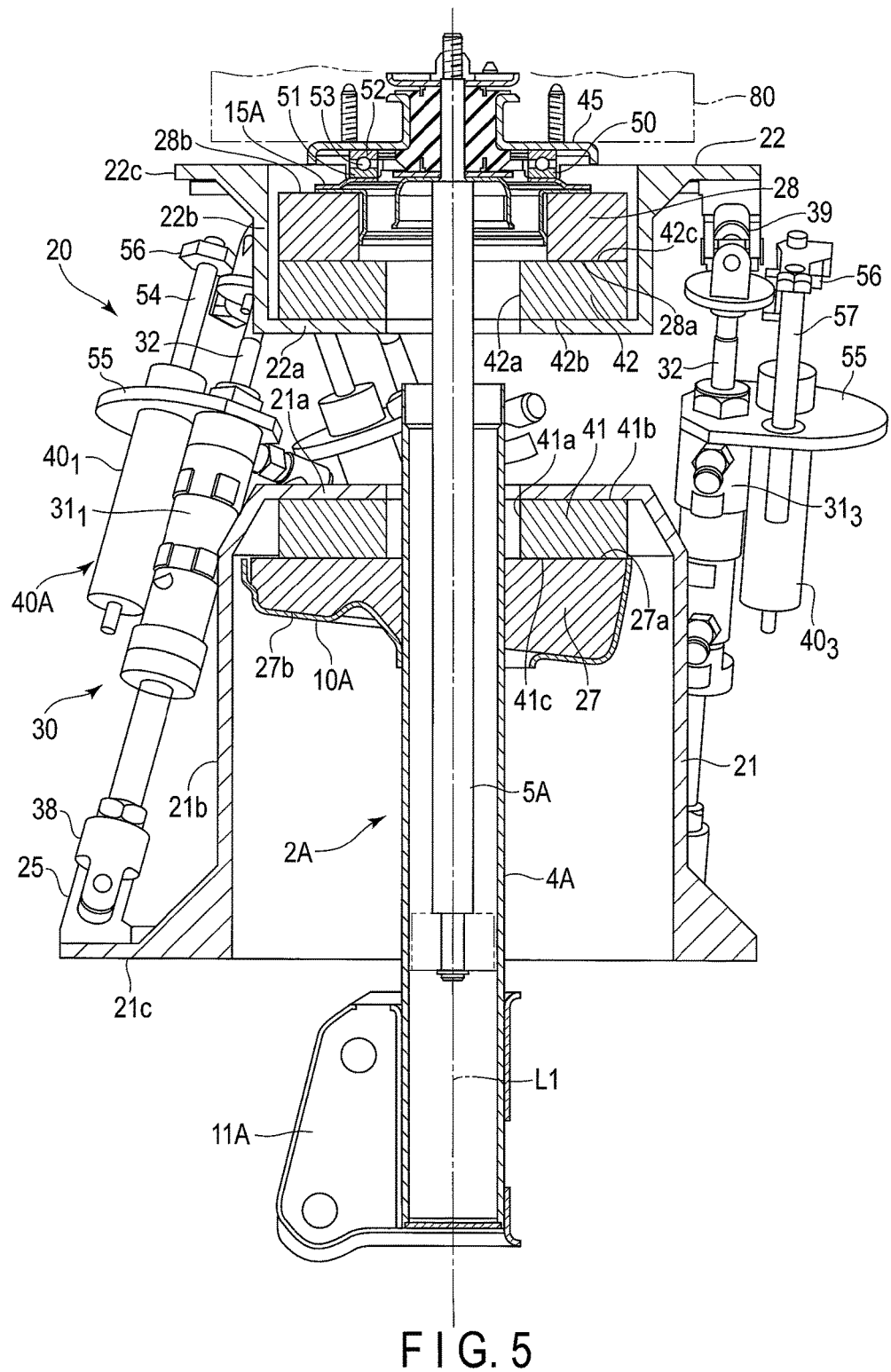
FIG. 5 is a cross-sectional view taken along line F5-F5 of FIG. 4.

A coil spring modeling apparatus 20 according to an embodiment will now be described with reference to FIGS. 2 to 10. FIG. 2 is a perspective view of the coil spring modeling apparatus 20. FIG. 3 is a side view of the coil spring modeling apparatus 20. FIG. 4 is a bottom view of the coil spring modeling apparatus 20. FIG. 5 is a cross-sectional view taken along line F5-F5 of FIG. 4.

A strut 2A (FIG. 5) which is used in the coil spring modeling apparatus 20 comprises an outer tube 4A as a first strut element, a rod 5A as a second strut element, a lower spring seat 10A, a bracket 11A, and an upper spring seat 15A. The lower spring seat 10A is attached to the outer tube 4A. The upper spring seat 15A is disposed near the upper end of the rod 5A above the lower spring seat 10A. The rod 5A can be moved along axis $L_1$ (strut axis) relative to the outer tube 4A.

The coil spring modeling apparatus 20 comprises a first attachment member 21, a second attachment member 22, a first seat adapter 27, a second seat adapter 28, an actuator unit 30 comprising a Stewart-platform-type parallel mechanism, a hydraulic pressure supply device 37, a torsion detection mechanism 40A, a first inner load cell 41, a second inner load cell 42, a base member 45, a rotation support mechanism 50, a controller 70, etc. The actuator unit 30 is rotatably supported about the strut axis by the rotation support mechanism 50. The friction of the rotation support mechanism 50 affects the kingpin moment (KPM).

As will be described in detail later, a signal regarding a torsional angle detected by the torsion detection mechanism 40A is input to the controller 70. The controller 70 controls the hydraulic pressure supply device 37. The hydraulic pressure supply device 37 supplies the controlled fluid pressure to the actuator unit 30.

The first attachment member 21 is secured to the lower spring seat 10A. The first attachment member 21 comprises a first disk portion 21a disposed above the lower spring seat 10A, a first extending portion 21b having a cylindrical shape which extends downward from the first disk portion 21a, and a first flange portion 21c projecting outward from the lower end of the first extending portion 21b. That is, the first attachment member 21 is substantially shaped like a hat. A lower joint connection portion 25 is circumferentially provided at each of six places in the first flange portion 21c.

The second attachment member 22 is secured to the upper spring seat 15A. The second attachment member 22 comprises a second disk portion 22a disposed below the upper spring seat 15A, a second extending portion 22b having a cylindrical shape which extends upward from the second disk portion 22a, and a second flange portion 22c projecting outward from the upper end of the second extending portion 22b. That is, the second attachment member 22 is shaped like an upside-down hat. An upper joint connection portion 26 is circumferentially provided at each of six places in the second flange portion 22c.

The first seat adapter 27 is arranged on the lower spring seat 10A. The first seat adapter 27 is formed of a light alloy whose specific gravity is smaller than that of iron such as aluminum alloy, and has a flat upper surface 27a. A lower surface 27b of the first seat adapter 27 has a shape which fits into the lower spring seat 10A.

The second seat adapter 28 is arranged under the upper spring seat 15A. The second seat adapter 28 is also formed of a light alloy such as aluminum alloy, and has a flat lower surface 28a. An upper surface 28b of the second seat adapter 28 has the shape which contacts the upper spring seat 15A. The lower surface 28a of the second seat adapter 28 is parallel to the lower surface 27b of the first seat adapter 27.

The flange portion 21c of the first attachment member 21 is positioned below the lower spring seat 10A. The flange portion 22c of the second attachment member 22 is positioned above the upper spring seat 15A. The actuator unit 30 which extends and retracts by fluid pressure is arranged between these flange portions 21c and 22c. An example of the actuator unit 30 comprises a Stewart-platform-type parallel mechanism.

Figure 6:
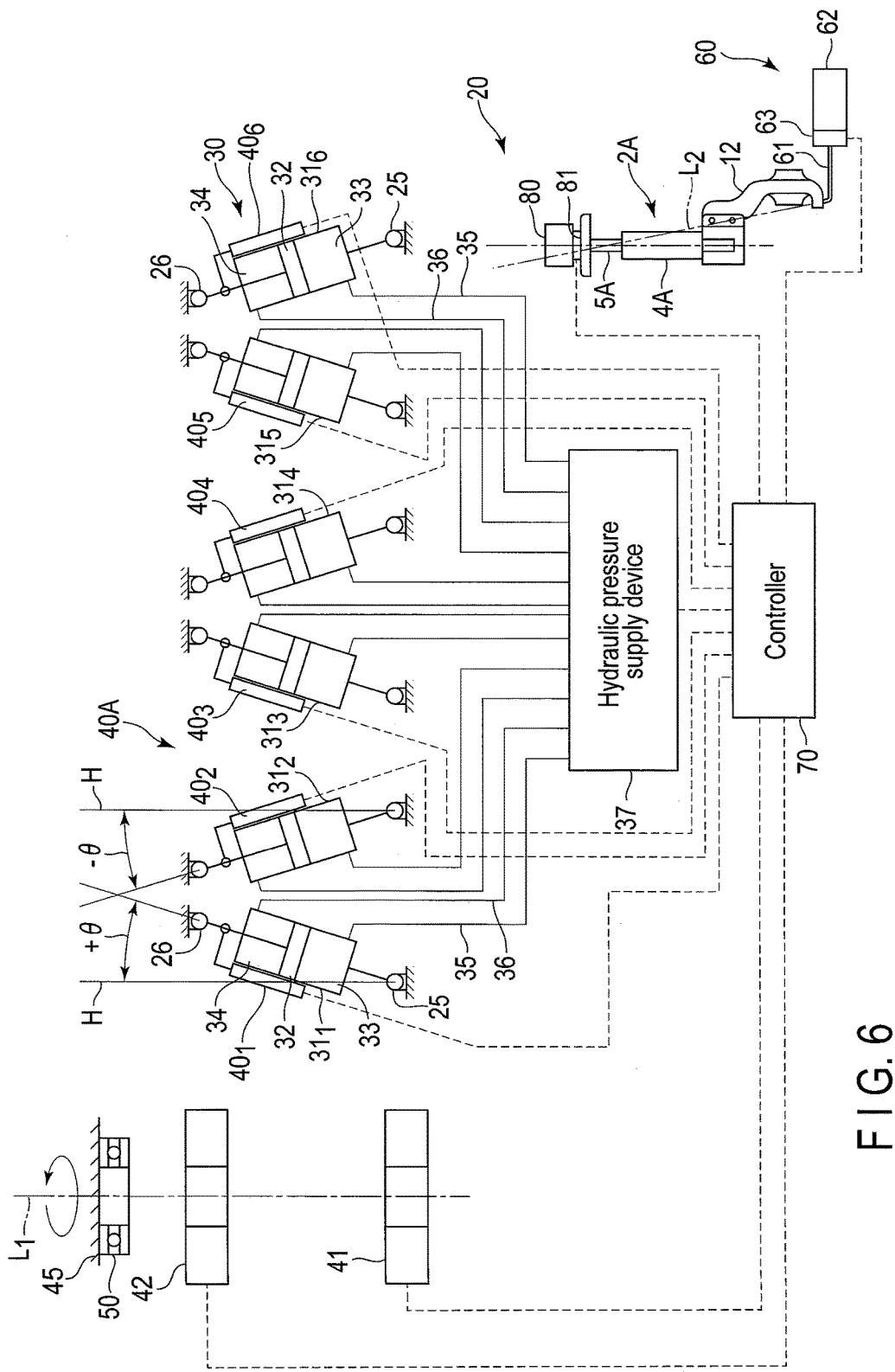
FIG. 6 is a block diagram showing a schematic structure of the coil spring modeling apparatus shown in FIG. 2.

FIG. 6 is a block diagram showing the structure of the coil spring modeling apparatus 20. FIG. 7 is a perspective view which schematically shows a part of the coil spring modeling apparatus 20. The actuator unit 30 comprising the Stewart-platform-type parallel mechanism includes six hydraulic cylinders $31_1$ to $31_6$. These hydraulic cylinders $31_1$ to $31_6$ are arranged such that their inclinations are changed alternately, that is, the angles of adjacent hydraulic cylinders with respect to vertical line H (FIG. 6) are respectively $+\theta$ and $-\theta$ in turn.

Since the structures of the six hydraulic cylinders $31_1$ to $31_6$ are common to each other, the first hydraulic cylinder $31_1$ will be described as a typical example of the hydraulic cylinders. The hydraulic cylinder $31_1$ comprises a piston rod 32 actuated by fluid pressure (for example, oil pressure), a first hydraulic chamber 33 which moves the piston rod 32 in a first direction (the extending side), and a second hydraulic chamber 34 which moves the piston rod 32 in a second direction (the retracting side). The first hydraulic chamber 33 and the second hydraulic chamber 34 are connected to the hydraulic pressure supply device 37 via hoses 35 and 36, respectively.

The hydraulic cylinder $31_1$ can be moved to the extending side or the retracting side by supplying fluid pressure produced by the hydraulic pressure supply device 37 to the first hydraulic chamber 33 or the second hydraulic chamber 34. The lower end of the hydraulic cylinder $31_1$ is swingably connected to the joint connection portion 25 of the first attachment member 21 by a universal joint 38 typified by a ball joint. The upper end of the hydraulic cylinder $31_1$ is swingably connected to the joint connection portion 26 of the second attachment member 22 by a universal joint 39 typified by a ball joint.

In the hydraulic cylinders $31_1$ to $31_6$, linear displacement gauges $40_1$ to $40_6$ are provided, respectively. The torsion detection mechanism 40A is constituted of these displacement gauges $40_1$ to $40_6$. Since the structures of the displacement gauges $40_1$ to $40_6$ are common to each other, the first displacement gauge $40_1$ provided on the first hydraulic cylinder $31_1$ will be described as a typical example of the displacement gauges.

An example of the displacement gauge $40_1$ is a linear variable differential transformer (LVDT) comprising a plunger 54. The displacement gauge $40_1$ detects a linear displacement relative to a reference length of the hydraulic cylinder $31_1$ (a reference position of the piston rod 32). As other examples of the displacement gauge $40_1$, linear displacement gauges such as an optical linear encoder and a magnetic linear scale may be adopted. Alternatively, a linear displacement gauge based on other detection principles may be adopted.

The displacement gauge $40_1$ is mounted on the hydraulic cylinder $31_1$ by a mounting plate 55. The plunger 54 of the displacement gauge $40_1$ is connected to a distal end of the piston rod 32 of the hydraulic cylinder $31_1$ by means of a coupling member 56. A guide rod 57 is inserted into the mounting plate 55. The guide rod 57 is connected to the plunger 54 by the coupling member 56. The piston rod 32, the plunger 54, and the guide rod 57 move along the axis of the hydraulic cylinder $31_1$ in a state where they are kept parallel to one another. The guide rod 57 guides linear motion of the piston rod 32 and the plunger 54. Note that since the structures of the other displacement gauges $40_2$ to $40_6$ have commonalities with the first displacement gauge $40_1$, common reference numbers are assigned to common parts in FIGS. 2 to 5.

When torsion is produced between the lower spring seat 10A and the upper spring seat 15A, each of the hydraulic cylinders $31_1$ to $31_6$ extends and retracts in accordance with the torsional angle. For example, when the second attachment member 22 is twisted in a first direction relative to the first attachment member 21, the first, third, and fifth hydraulic cylinders $31_1$, $31_3$, and $31_5$ extend, and the second, fourth, and sixth hydraulic cylinders $31_2$, $31_4$, and $31_6$ retract. Conversely, when the second attachment member 22 is twisted in a second direction relative to the first attachment member 21, the first, third, and fifth hydraulic cylinders $31_1$, $31_3$, and $31_5$ retract, and the second, fourth, and sixth hydraulic cylinders $31_2$, $31_4$, and $31_6$ extend. Thus, by detecting the change in length of each of the hydraulic cylinders $31_1$ to $31_6$ by the displacement gauges $40_1$ to $40_6$, the magnitude of torsion produced between the lower spring seat 10A and the upper spring seat 15A, that is, the torsional angle formed between the first attachment member 21 and the second attachment member 22, can be obtained.

When the first attachment member 21 and the second attachment member 22 are parallel to each other, the torsional angle may be detected based on the output (displacement amount) of at least one of the six displacement gauges $40_1$ to $40_6$. When the first attachment member 21 and the second attachment member 22 are not parallel to each other, the torsional angle should be detected based on the output of all of the displacement gauges $40_1$ to $40_6$.

The first inner load cell 41 is arranged between the disk portion 21a of the first attachment member 21 and the first seat adapter 27. The first inner load cell 41 is accommodated within the first attachment member 21, and is disposed above the lower spring seat 10A. The first inner load cell 41 comprises a through-hole 41a into which the outer tube 4A is inserted, a flat upper surface 41b which contacts a lower surface of the first disk portion 21a, and a flat lower surface 41c which contacts the upper surface 27a of the first seat adapter 27, and has an annular shape as a whole. The first inner load cell 41 is secured to the first seat adapter 27 such that the upper surface 41b and the lower surface 41c of the first inner load cell 41 are perpendicular to axis $L_1$.

The first inner load cell 41 is arranged coaxially with the rotation support mechanism 50, that is, the center of the inner load cell 41 conforms to axis $L_1$. The first inner load cell 41 detects the axial force acting on the upper surface 27a of the first seat adapter 27, and a moment about the axis. The first inner load cell 41 can rotate about axis $L_1$ together with the outer tube 4A, the lower spring seat 10A, the first seat adapter 27, and the first attachment member 21.

The second inner load cell 42 is arranged between the disk portion 22a of the second attachment member 22 and the second seat adapter 28. The second inner load cell 42 is accommodated within the second attachment member 22, and is disposed below the upper spring seat 15A. The second inner load cell 42 comprises a through-hole 42a into which the rod 5A is inserted, a flat lower surface 42b which contacts an upper surface of the second disk portion 22a, and a flat upper surface 42c which contacts the lower surface 28a of the second seat adapter 28, and has an annular shape as a whole. The second inner load cell 42 is secured to the second seat adapter 28 such that the lower surface 42b and the upper surface 42c of the second inner load cell 42 are perpendicular to axis $L_1$.

Like the first inner load cell 41, the second inner load cell 42 is arranged coaxially with the rotation support mechanism 50, that is, the center of the inner load cell 42 conforms to axis $L_1$. The second inner load cell 42 detects the axial force acting on the lower surface 28a of the second seat adapter 28, and a moment about the axis. The second inner load cell 42 can rotate about axis $L_1$ together with the upper spring seat 15A, the second attachment member 22, and the second seat adapter 28.

The rotation support mechanism 50 is disposed between the upper spring seat 15A and the base member 45. The rotation support mechanism 50 rotatably supports the actuator unit 30 about axis $L_1$ with respect to the base member 45. An example of the rotation support mechanism 50 is a ball bearing, and the rotation support mechanism 50 comprises a lower ring member 51, an upper ring member 52, and a plurality of rolling members 53 accommodated between these ring members 51 and 52. The lower ring member 51 is disposed on an upper surface of the upper spring seat 15A. The upper ring member 52 is disposed on a lower surface of the base member 45.

A push-pull testing unit 60 (FIG. 6) is an example of detection means for detecting a kingpin moment (KPM). The push-pull testing unit 60 comprises a linear actuator 62 configured to push and pull a tie rod 61, and a load cell 63 which measures the axial force applied to the tie rod 61 (i.e., the tie rod axial force). The tie rod 61 is connected to the knuckle member 12.

The operation of the coil spring modeling apparatus 20 will now be described.

The actuator unit 30 comprising the Stewart-platform-type parallel mechanism forms a field of arbitrary force of six degrees of freedom by combining axial forces $P_1$ to $P_6$ shown in FIG. 7. That is, of vectors of force produced by six hydraulic cylinders $31_1$ to $31_6$, a resultant of components along axis $L_1$ constitutes a reactive force corresponding to that of a coil spring. For example, if a value obtained by combining the six axial forces $P_1$ to $P_6$ is positive, an upward force $P_Z$ along axis $L_1$ is produced.

When the actuator unit 30 is compressed between the lower spring seat 10A and the upper spring seat 15A, of vectors of force produced by the six hydraulic cylinders $31_1$ to $31_6$, an axial force is applied to the lower spring seat 10A. In this case, three orthogonal axial forces ($P_X$, $P_Y$, $P_Z$) with respect to the coordinate system of FIG. 7, and three moments ($M_X$, $M_Y$, $M_Z$) are produced. A six-component force ($P_X$, $P_Y$, $P_Z$, $M_X$, $M_Y$, $M_Z$) applied to the lower spring seat 10A is detected by the first inner load cell 41 and input to the controller 70 (FIG. 6). Further, a six-component force applied to the upper spring seat 15A is detected by the second inner load cell 42 and input to the controller 70. Based on these six-component forces, reactive force central position (load axis) $L_3$ is calculated.

Also, a total of moments that the six axial forces $P_1$ to $P_6$ have an effect on around axis $L_1$ constitutes moment $M_Z$ about axis $L_1$. For example, in FIG. 7, if the total of forces produced by three hydraulic cylinders $31_1$, $31_3$, and $31_5$ (i.e., the axial forces that produce the positive moment $M_Z$) is greater than the total of forces of the other three hydraulic cylinders $31_2$, $31_4$, and $31_6$ (i.e., the axial forces that produce the negative moment $M_Z$), moment $M_Z$ having a positive value is produced at an upper end of the actuator unit 30 (the upper spring seat 15A). That is, components around the axes of vectors of forces produced by the six hydraulic cylinders $31_1$ to $31_6$ correspond to the moment ($M_Z$) about axis $L_1$. Also at kingpin axis $L_2$, a moment (a kingpin moment) about kingpin axis $L_2$ is produced by the effect of the six-component force.

A performance test of the strut 2A (for example, measurement of the sliding resistance of the strut 2A and the kingpin moment) can be performed by using the coil spring modeling apparatus 20 of the present embodiment. FIGS. 5 and 6 show reference number 80, which represents a part of a load testing machine. A predetermined load is applied to the coil spring modeling apparatus 20 by the load testing machine. Since the distance between the lower spring seat 10A and the upper spring seat 15A is reduced by the load, a vertical reaction is produced. While this vertical reaction is being produced, the base member 45 is moved vertically with, for example, vertical strokes of ±5 mm, and a rectangular waveform of 0.5 Hz, and the load is measured by an external load cell 81. The frictional force produced in the strut 2A can be evaluated as a half of the value of hysteresis of the measured load.

In a state where a predetermined vertical reaction is produced between the lower spring seat 10A and the upper spring seat 15A, a kingpin moment (KPM) is detected by the push-pull testing unit 60 (FIG. 6). For example, the knuckle member 12 is pivoted in the first direction and the second direction alternately by the linear actuator 62, and the axial force applied to the tie rod 61 is detected by the load cell 63. Further, based on a difference between the axial force for pivoting the knuckle member 12 in the first direction and the axial force for pivoting the same in the second direction, the kingpin moment is calculated.

Figure 8:
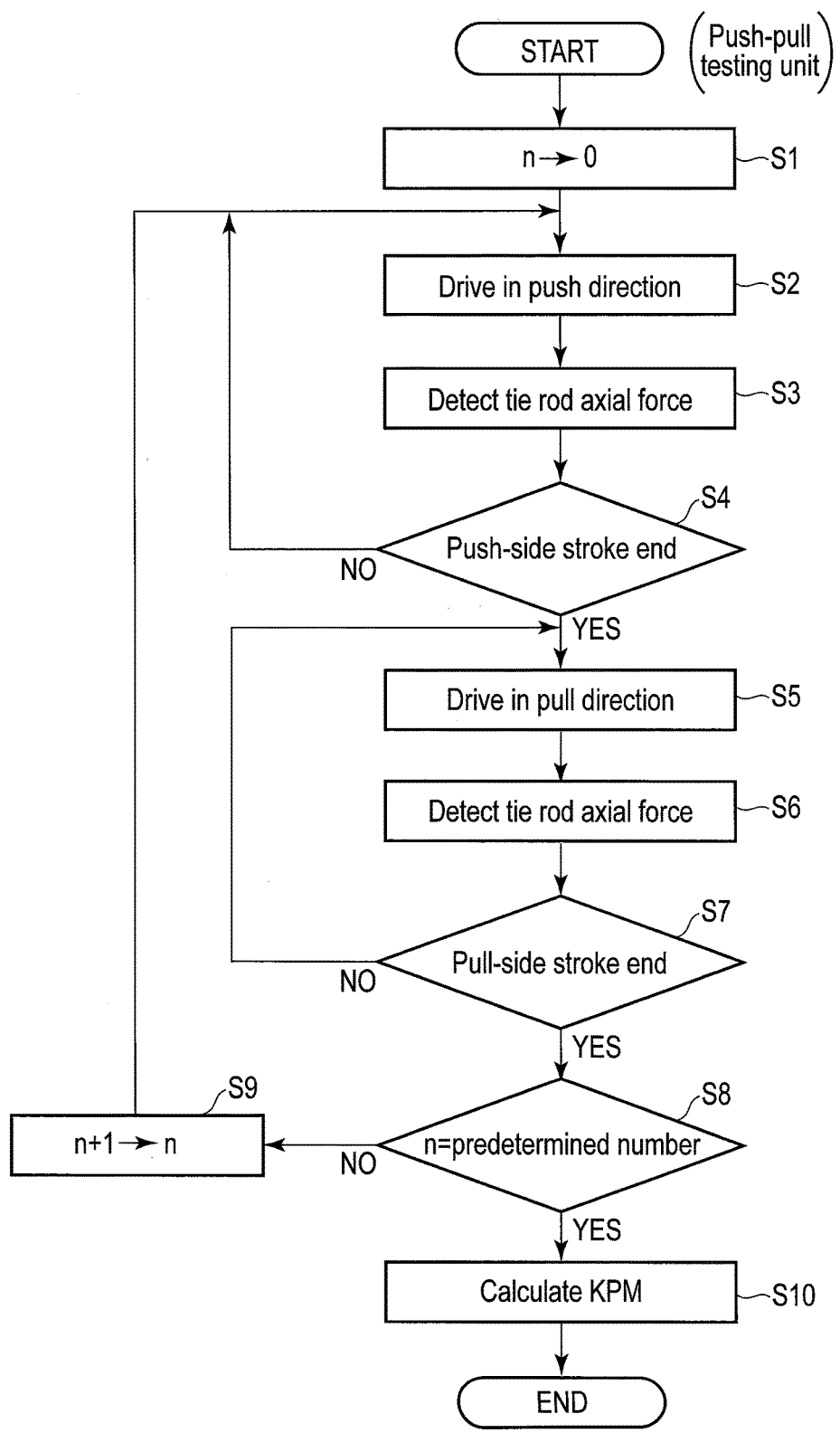
FIG. 8 is a flowchart showing a part of control of a push-pull testing unit.
Figure 9:
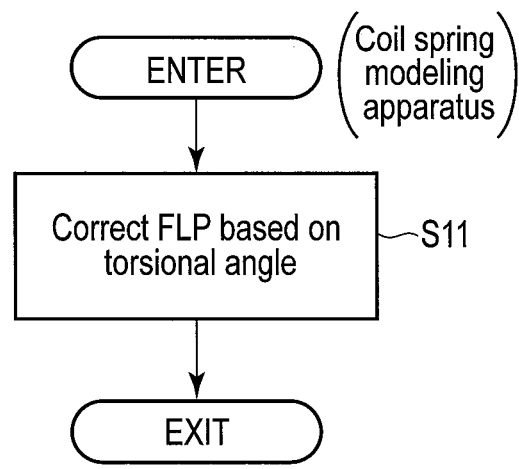
FIG. 9 is a flowchart showing an example of control of the coil spring modeling apparatus shown in FIG. 2.

FIG. 8 is a flowchart showing an example of steps for obtaining the kingpin moment (KPM) by using the push-pull testing unit 60. In step S1 in FIG. 8, a counter value (n) is set to zero. In step S2, the knuckle member 12 is driven in the push direction (first direction) by the linear actuator 62. In step S3, an axial force applied to the tie rod 61 (the tie rod axial force) is detected by the load cell 63. In step S4, it is determined whether the linear actuator 62 has reached a stroke end on the push side, and if the linear actuator 62 has reached the stroke end (YES), the processing proceeds to step S5. In step S4, if the linear actuator 62 has not reached the stroke end (NO), the processing returns to step S2, and the driving in the push direction is continued.

In step S5, the knuckle member 12 is driven in the pull direction (second direction) by the linear actuator 62. In step S6, an axial force applied to the tie rod 61 (the tie rod axial force) is detected by the load cell 63. In step S7, it is determined whether the linear actuator 62 has reached a stroke end on the pull side, and if the linear actuator 62 has reached the stroke end (YES), the processing proceeds to step S8. In step S7, if the linear actuator 62 has not reached the stroke end (NO), the processing returns to step S5, and the driving in the pull direction is continued.

In step S8, it is determined whether the counter value (n) has reached a predetermined number. In step S8, if the counter value (n) is not the predetermined number (NO), the processing returns to step S2 after the counter value (n) has been incremented by one. In step S8, if the counter value (n) is the predetermined number (YES), the processing proceeds to step S10. In step S10, a kingpin moment (KPM) is calculated based on a difference between the tie rod axial force in the push direction and that in the pull direction.

As described above, while a torque about the kingpin axis is being applied to the coil spring modeling apparatus 20 by the push-pull testing unit 60, a relative torsional angle formed by the lower spring seat 10A and the upper spring seat 15A is detected by the torsion detection mechanism 40A in real time. For example, in step S11 shown in FIG. 9, the position of the reactive force center line (i.e., the force line position [FLP]) is corrected by a coordinate transformation based on the torsion angle. A more accurate kingpin moment can be obtained based on the corrected FLP.

Figure 10:
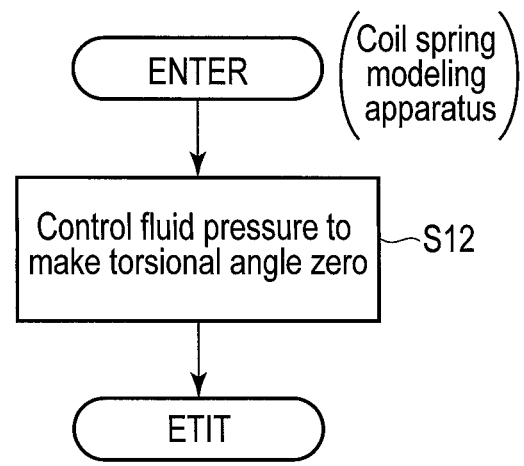
FIG. 10 is a flowchart showing another example of control of the coil spring modeling apparatus shown in FIG. 2.

Alternatively, as shown in FIG. 10, in step S12 (i.e., torsion angle control), the fluid pressure of the hydraulic cylinders $31_1$ to $31_6$ is controlled such that the torsion angle becomes zero. That is, the hydraulic pressure supply device 37 controls the fluid pressure of each of the hydraulic cylinders $31_1$ to $31_6$ such that the torsional angle becomes zero, on the basis of the output of the displacement gauges $40_1$ to $40_6$. Note that step S11 shown in FIG. 9 (i.e., FLP correction) and step S12 shown in FIG. 10 (i.e., torsional angle control) may be combined.

As described above, a method of controlling the coil spring modeling apparatus 20 of the present embodiment includes the following steps for measuring the kingpin moment:

(1) Apply a torque in the first direction (push side) to the first strut element (the outer tube 4A);

(2) Detect a torsional angle formed between the first attachment member 21 and the second attachment member 22 by the torsion detection mechanism 40A;

(3) Detect a tie rod axial force in the first direction (push side);

(4) Apply a torque in the second direction (pull side) to the first strut element (the outer tube 4A);

(5) Detect a torsional angle formed between the first attachment member 21 and the second attachment member 22 by the torsion detection mechanism 40A;

(6) Detect a tie rod axial force in the second direction (pull side);

(7) Correct the force line position based on the torsional angle, or control the hydraulic cylinders; and (8) Calculate a kingpin moment (KPM) based on the tie rod axial force.

It should be noted that the coil spring modeling apparatus according to the embodiment of the present invention can be applied to other types of suspension system having a strut, i.e., suspension systems other than the McPherson-strut-type suspension. The actuator unit is not limited to the Stewart-platform-type parallel mechanism, and any actuator unit comprising a hydraulic or pneumatic cylinder which extends and retracts by pressure of a fluid (liquid or gas) may be adopted. As other examples of the actuator unit, a linear actuator including a ball screw and a servo motor, or a differential-transformer-type linear actuator may be adopted. An actuator unit other than the above may be adopted. Further, needless to say, the structure, form, and arrangement or the like of each of the elements which constitutes the coil spring modeling apparatus, such as the first and second attachment members and the torsion detection mechanism, may be modified variously in implementing the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coil spring modeling apparatus provided on a strut comprising a lower spring seat and an upper spring seat, the coil spring modeling apparatus comprising:
   a first attachment member disposed on the lower spring seat;
   a second attachment member disposed on the upper spring seat;
   an actuator unit which is arranged between the first attachment member and the second attachment member, and which is extendible and retractable;
   a torsion detection mechanism comprising a displacement gauge configured to detect a relative displacement including a torsional angle formed between the first attachment member and the second attachment member; and
   a controller configured to control the actuator unit and to correct a force line position based on an amount of the displacement when the displacement is detected by the displacement gauge of the torsion detection mechanism.

2. The apparatus of claim 1, wherein the actuator unit comprises a Stewart-platform-type parallel mechanism including six hydraulic cylinders arranged with their inclinations changed alternately between the first attachment member and the second attachment member.

3. The apparatus of claim 1, wherein the controller controls the actuator unit such that the torsional angle becomes zero when the torsional angle is detected by the torsion detection mechanism.

4. The apparatus of claim 2, wherein the torsion detection mechanism comprises a plurality of the displacement gauges which are provided on the hydraulic cylinders and detect amounts of displacement relative to reference lengths of the hydraulic cylinders, respectively.

5. The apparatus of claim 4, wherein each of the displacement gauges is a linear variable differential transformer (LVDT) comprising a plunger, and the apparatus further comprises a guide rod which is arranged parallel to the plunger and guides a linear motion of the plunger.

6. The apparatus of claim 1, further comprising a first inner load cell configured to detect an axial force applied to the lower spring seat and a moment about the axis, and a second inner load cell configured to detect an axial force applied to the upper spring seat and a moment about the axis.

7. A method of controlling a coil spring modeling apparatus, which comprises:
   an actuator unit including hydraulic cylinders arranged between a first attachment member disposed on a lower spring seat and a second attachment member disposed on an upper spring seat; and
   a hydraulic pressure supply device which supplies fluid pressure to the hydraulic cylinders,
   the method comprising:
   applying a torque about a kingpin axis to the first attachment member relative to the second attachment member;
   detecting a torsional angle formed between the first attachment member and the second attachment member; and
   correcting a force line position or controlling the hydraulic cylinders based on the detected torsional angle.

8. A coil spring modeling apparatus provided on a strut comprising a lower spring seat and an upper spring seat, the coil spring modeling apparatus comprising:
- a first attachment member disposed on the lower spring seat;
- a second attachment member disposed on the upper spring seat;
- an actuator unit which is arranged between the first attachment member and the second attachment member, and which is extendible and retractable;
- a controller configured to control the actuator unit; and
- a torsion detection mechanism configured to detect a torsional angle formed between the first attachment member and the second attachment member;
- wherein the controller controls the actuator unit such that the torsional angle becomes zero when the torsional angle is detected by the torsion detection mechanism.

* * * * *